(12) United States Patent  
Ulm et al.

(10) Patent No.: US 8,786,419 B2  
(45) Date of Patent: Jul. 22, 2014

(54) METHOD FOR CONTROLLING A DEVICE AND A DEVICE FOR CONTROLLING THE DEVICE

(75) Inventors: Markus Ulm, Wannweil (DE); Mathias Reimann, Ditzingen (DE); Harald Emmerich, Kusterdingen (DE); Udo-Martin Gomez, Leonberg (DE); Emma Abel, Ostfildern (DE)

(73) Assignee: Robert Bosch GmbH, Stuttgart (DE)

( * ) Notice: Subject to any disclaimer, the term of this patent is extended or adjusted under 35 U.S.C. 154(b) by 895 days.

(21) Appl. No.: 12/611,662

(22) Filed: Nov. 3, 2009

(65) Prior Publication Data  
US 2010/0225500 A1 Sep. 9, 2010

(30) Foreign Application Priority Data  
Nov. 4, 2008 (DE) .......................... 10 2008 043 475

(51) Int. Cl.  
*G01C 19/00* (2013.01)  
*G01P 3/44* (2006.01)  
*G01P 15/08* (2006.01)  
*B60Q 1/00* (2006.01)  
*G08G 1/09* (2006.01)

(52) U.S. Cl.  
USPC ........... 340/440; 340/436; 340/437; 340/438; 340/439; 340/429; 340/689; 73/504.02; 73/504.03; 73/504.04; 73/504.05; 73/504.06; 73/514.15

(58) Field of Classification Search  
CPC ....................................... B60R 21/01–21/0176  
USPC ............. 73/514.15, 504.02–504.06; 340/825, 340/436–440  
See application file for complete search history.

(56) References Cited

U.S. PATENT DOCUMENTS

| | | | | | |
|---|---|---|---|---|---|
| 3,505,641 | A | * | 4/1970 | Boskovich | 340/974 |
| 3,961,536 | A | * | 6/1976 | Ringwall | 73/514.12 |
| 4,000,659 | A | * | 1/1977 | Li | 73/504.08 |
| 5,301,902 | A | * | 4/1994 | Kalberer et al. | 244/121 |
| 5,794,151 | A | * | 8/1998 | McDonald et al. | 455/454 |
| 5,809,439 | A | * | 9/1998 | Damisch | 701/45 |
| 5,996,409 | A | * | 12/1999 | Funk et al. | 73/504.04 |
| 6,002,974 | A | * | 12/1999 | Schiffmann | 701/36 |
| 6,038,495 | A | * | 3/2000 | Schiffmann | 701/1 |
| 6,055,472 | A | * | 4/2000 | Breunig et al. | 701/45 |
| 6,070,113 | A | * | 5/2000 | White et al. | 701/45 |
| 6,169,946 | B1 | * | 1/2001 | Griessbach | 701/45 |
| 6,212,455 | B1 | * | 4/2001 | Weaver | 701/45 |
| 6,225,894 | B1 | * | 5/2001 | Kyrtsos | 340/440 |
| 6,292,759 | B1 | * | 9/2001 | Schiffmann | 702/151 |
| 6,373,147 | B1 | * | 4/2002 | Miyaguchi et al. | 307/10.1 |
| 6,433,681 | B1 | * | 8/2002 | Foo et al. | 340/440 |
| 6,496,759 | B1 | * | 12/2002 | Mattes et al. | 701/1 |
| 6,542,073 | B2 | * | 4/2003 | Yeh et al. | 340/440 |
| 6,600,985 | B2 | * | 7/2003 | Weaver et al. | 701/45 |
| 6,694,226 | B2 | * | 2/2004 | Tobaru et al. | 701/1 |

(Continued)

*Primary Examiner* — Steven Lim  
*Assistant Examiner* — Muhammad Adnan  
(74) *Attorney, Agent, or Firm* — Kenyon & Kenyon LLP

(57) ABSTRACT

A device for controlling a device by using a rotation-rate sensor. In order to provide a device for determining a triggering signal for a safety device which allows a particularly compact implementation of the device, the device is set up to ascertain an acceleration variable on the basis of a first sensor signal for a first seismic mass of the rotation-rate sensor and the second sensor signal for a second seismic mass of the rotation-rate sensor and to control the device as a function of the acceleration variable.

7 Claims, 3 Drawing Sheets

(56) References Cited

U.S. PATENT DOCUMENTS

| | | | |
|---|---|---|---|
| 6,751,481 B2* | 6/2004 | Chen et al. | 455/564 |
| 6,826,468 B2* | 11/2004 | Williams | 701/70 |
| 6,827,172 B2* | 12/2004 | Ide et al. | 180/282 |
| 7,191,045 B2* | 3/2007 | Eisele et al. | 701/45 |
| 7,584,035 B2* | 9/2009 | Meissner | 701/45 |
| 7,637,161 B2* | 12/2009 | Vornbrock et al. | 73/587 |
| 7,805,231 B2* | 9/2010 | Cluff et al. | 701/45 |
| 8,051,713 B2* | 11/2011 | De Boer et al. | 73/514.16 |
| 2003/0093201 A1* | 5/2003 | Schubert et al. | 701/46 |
| 2004/0019418 A1* | 1/2004 | Lu et al. | 701/38 |
| 2005/0288893 A1* | 12/2005 | Gassner | 702/182 |
| 2006/0290499 A1* | 12/2006 | Chang | 340/572.1 |

* cited by examiner

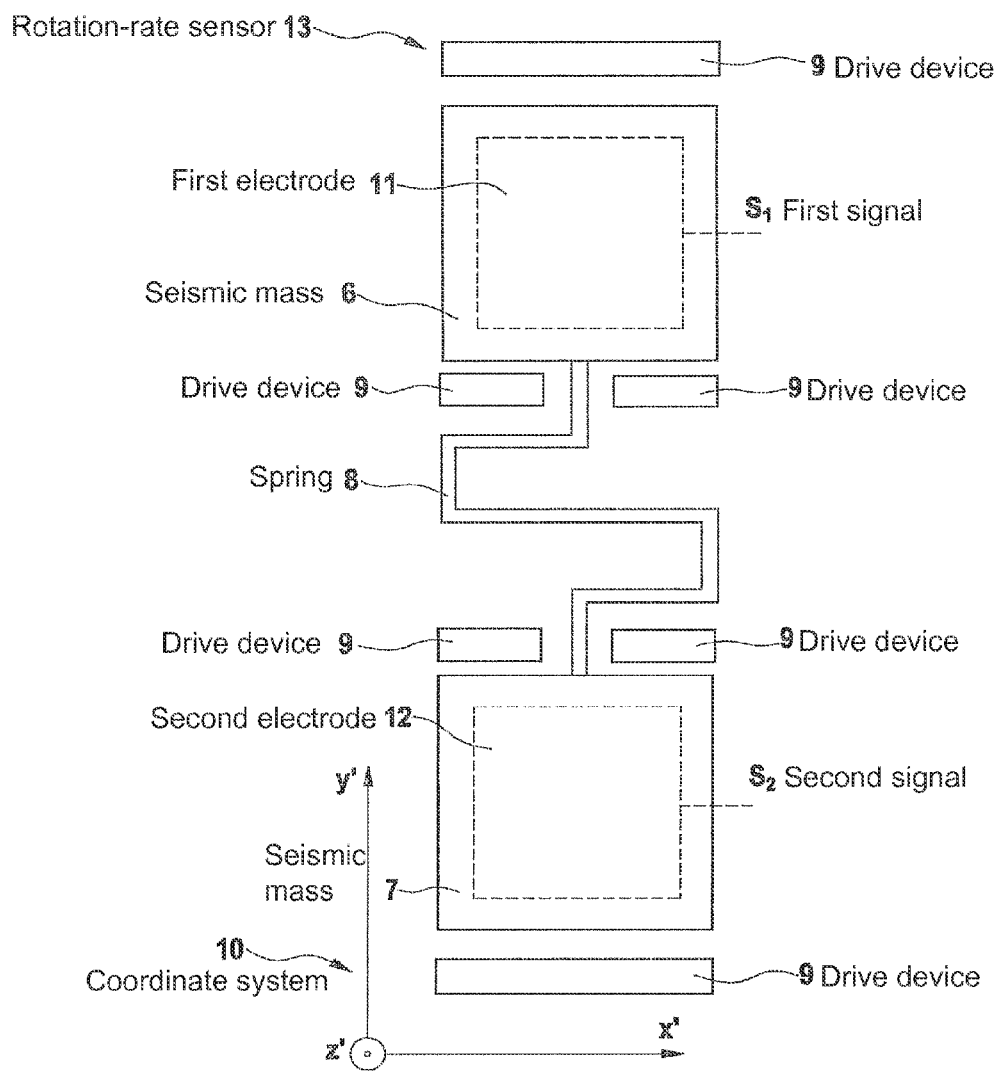

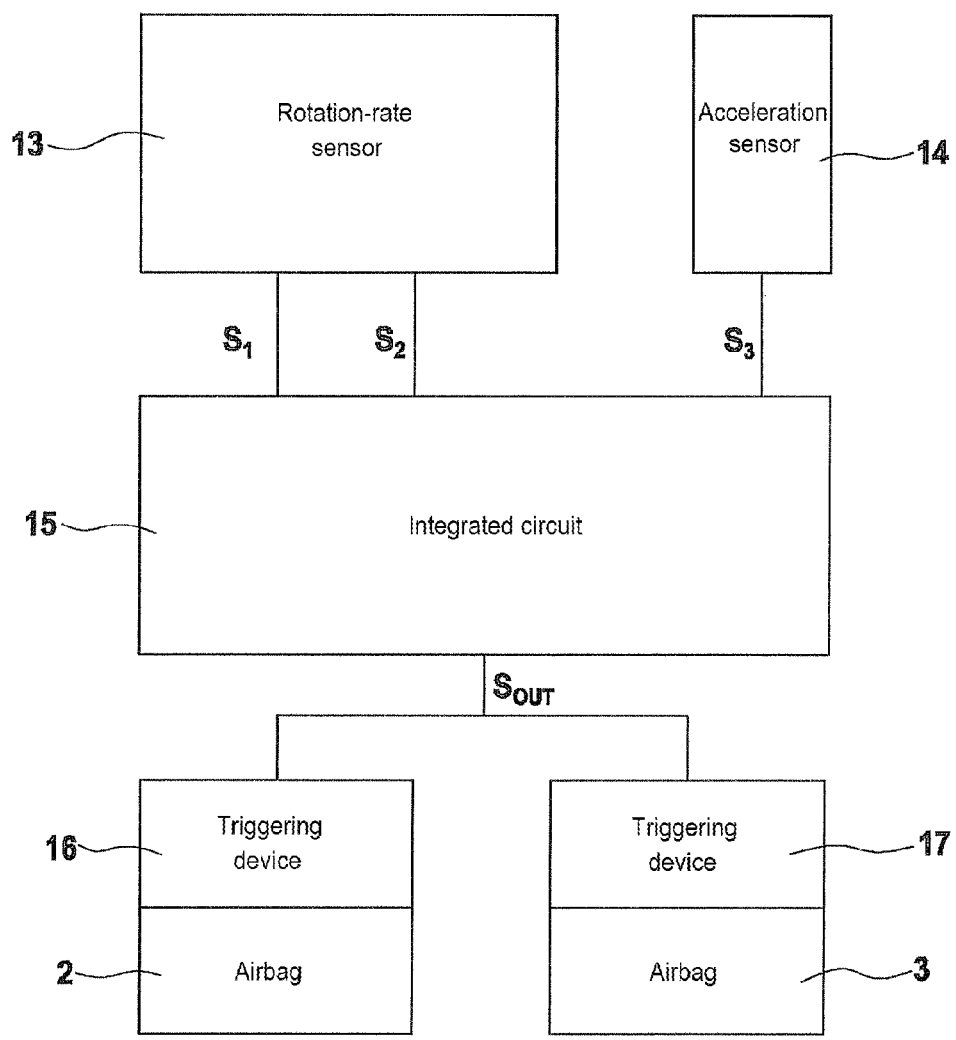

METHOD FOR CONTROLLING A DEVICE AND A DEVICE FOR CONTROLLING THE DEVICE

BACKGROUND INFORMATION

A method for controlling a device by using a rotation-rate sensor ascertains a rotation rate and controls the device as a function of the ascertained rotation rate and an acceleration variable, which is measured by an acceleration sensor. The device is, for example, a safety device such as a frontal airbag, a side airbag, or a rollover bar, which protects the occupant(s) of a motor vehicle in the event of rollover. To control the device, a triggering signal is determined in such a way that the side airbag is inflated and/or the rollover bar is extended if the motor vehicle rolls over. Extremely high reliability is necessary for the triggering of this safety device because the triggering of the safety device may cause an accident itself.

One disadvantage is that all existing signals, i.e., the rotation-rate variable and acceleration variable, are needed for the triggering. If one of the signals were faulty, the safety device could fail. For this reason, the method is monitored and checked for plausibility using various measures. In particular, if both signals were faulty, as would be the case for so-called common cause faults, the safety device could be triggered without a rollover occurring. The acceleration sensor and the rotation-rate sensor are therefore implemented in separate housings each having an analysis ASIC, in order to avoid shared fault paths because of one cause or external disturbance in both sensors at the same time. This increases the manufacturing costs.

SUMMARY OF THE INVENTION

The present invention is based on the object of providing a method for controlling a device and a device for controlling the device which allow a particularly compact implementation of the device.

The present invention relates to a method for controlling a device by using a rotation-rate sensor having the following steps: detecting a first sensor signal for a first seismic mass of the rotation-rate sensor; detecting a second sensor signal for a second seismic mass of the rotation-rate sensor; ascertaining an acceleration variable on the basis of the first sensor signal and the second sensor signal; and controlling the device as a function of the acceleration variable. A further measured variable is advantageously made usable for the control of the device by providing the acceleration variable. The acceleration variable is a variable which is an injective function of an acceleration in a range of interest, and is preferably proportional to a linear acceleration in a reference system.

In a preferred specific embodiment, the method has the following further steps: ascertaining a rotation-rate variable on the basis of the first sensor signal and a second sensor signal; and controlling the device as a function of the rotation-rate variable. The rotation-rate variable is a variable which is an injective function of a rotation rate in a range of interest, and is preferably proportional to the rotation rate. The use of an acceleration variable and a rotation-rate variable has already proven itself in practice as a criterion for determining a triggering signal.

In another preferred specific embodiment, the method has the following further steps: detecting a further acceleration variable; and controlling the device as a function of the further acceleration variable. The acceleration variable is used as a redundant measured variable in order to check the correctness of the further measured variable and thus to enhance the reliability of the method.

In a refinement of the last-mentioned preferred specific embodiment, the device is triggered when the acceleration variable exceeds a threshold value, and when the further acceleration variable exceeds a further threshold value. A criterion of this type may be implemented in a particularly simple manner.

Furthermore, the present invention relates to a device for controlling a device by using a rotation-rate sensor, which has a first seismic mass and a second seismic mass, the device being set up to ascertain an acceleration variable on the basis of the first sensor signal and the second sensor signal and to trigger the device as a function of the acceleration variable.

In a preferred specific embodiment, the device is further set up to ascertain a rotation-rate variable on the basis of the first sensor signal and the second sensor signal and to control the device as a function of the rotation-rate variable. The triggering signal and the further triggering signal may be identical if the device is to be triggered by one signal only.

In another preferred specific embodiment, the device is also set up to control the device as a function of a further acceleration variable from an acceleration sensor. The triggering signal and the still further triggering signal may also be identical if the safety device is to be triggered by one signal only.

In another preferred specific embodiment, an analysis device for the rotation-rate sensor, an analysis device for the acceleration sensor, and a plausibility check device are implemented as an integrated circuit.

In a refinement of the last-mentioned preferred specific embodiment, the device, the acceleration sensor, the rotation-rate sensor, and the integrated circuit are integrated on one chip. The chip is packaged in a housing. The total size of the individual elements may be decreased, and the manufacturing method may be simplified. Cost savings result therefrom. It is also possible to integrate the analysis device for the rotation-rate sensor and the rotation-rate sensor on one chip and/or to integrate the analysis device for the acceleration sensor and the acceleration sensor on one chip.

BRIEF DESCRIPTION OF THE DRAWINGS

FIG. 2 shows a simplified schematic view of a rotation-rate sensor.

FIG. 3 shows a schematic view of the device for controlling airbags.

DETAILED DESCRIPTION

Figure 1:
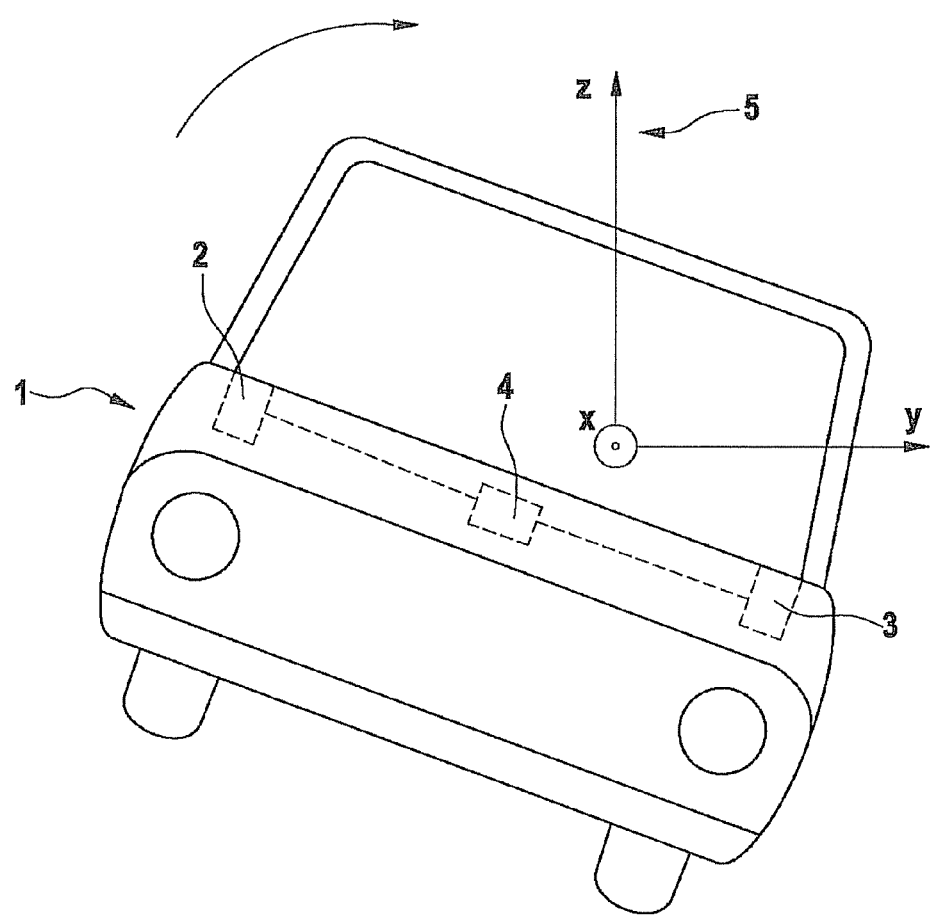
FIG. 1 shows a front view of a laterally inclined motor vehicle.

FIG. 1 shows a front view of a laterally inclined motor vehicle 1. Motor vehicle 1 has two side airbags 2 and 3 in the passenger compartment. A device 4 for controlling airbags 2, 3 first checks what kind of driving situation exists, i.e., whether, for example, motor vehicle 1 has exceeded a critical lateral inclination and is extremely likely to roll over, and causes triggering of airbags 2, 3 as a function thereof. Side airbags 2 and 3 and device 4 for controlling airbags 2, 3 are concealed by the vehicle body of motor vehicle 1 and are therefore shown using dashed lines in order to indicate their positions. A rotation of motor vehicle 5, which results in the lateral inclination, is described by an angular velocity vector $\vec{\omega}$, which is oriented along the x axis of a fixed coordinate system 5. For the side airbags to be inflated at the correct time in the case of a rollover, in order to protect the vehicle occupant(s), an absolute value of a rotation rate of the motor vehicle in degrees/second and an absolute value of an acceleration in the y and/or z directions are used as the triggering criterion. In addition, the rotation angle may also be used, by which the y axis is rotated with respect to a horizontal. The rotation angle may be calculated by integration of angular velocity vector $\vec{\omega}$.

FIG. 2 shows a simplified schematic view of a rotation-rate sensor 13. Rotation-rate sensor 13 has a symmetrical design and includes a first seismic mass 6 having mass m1 and a second seismic mass 7 having mass m2, which are both of equal weight because of the symmetry (m=m1=m2). Seismic masses 6, 7 are coupled to one another via a spring 8 and are connected directly via further springs (not shown) or indirectly via further springs and further elements to a substrate lying underneath them. Seismic masses 6, 7 have a specific electrical potential. Drive devices 9 set seismic masses 6, 7 into opposing oscillations having frequency $\Omega$ using an AC voltage along the y' axis of a coordinate system 10, which moves together with rotation-rate sensor 13. First seismic mass 6 oscillates at velocity $\vec{v}_1 = \vec{v}_0 \cdot \sin(\Omega \cdot t)$. Second seismic mass 7 oscillates at velocity $\vec{v}_2 = \vec{v}_0 \cdot \sin(\Omega \cdot t + \pi) = -\vec{v}_0 \cdot \sin(\Omega \cdot t)$. Axes x', y', and z' coincide with axes x, y, and z, respectively, when motor vehicle 1 is not inclined. A first electrode 11 is provided on the substrate below first seismic mass 6. A second electrode 12 is provided on the substrate below second seismic mass 7. Both seismic masses 6, 7 are each electrically insulated from the electrodes. When rotation-rate sensor 13 rotates with coordinate system 5 and the x axis, a first Coriolis force $\vec{F}_c = 2m \cdot (\vec{v}_1 \times \vec{\omega}) = 2m \cdot (\vec{v}_0 \times \vec{\omega}) \cdot \sin(\Omega \cdot t)$ acts in coordinate system x', y', and z' on first seismic mass 6 in coordinate system 10 having axes x', y', and z' and a second Coriolis force $\vec{F}_c = 2m \cdot (\vec{v}_2 \times \vec{\omega}) = -2m \cdot (\vec{v}_0 \times \vec{\omega}) \cdot \sin(\Omega \cdot t)$ acts on second seismic mass 7 in coordinate system x', y', and z'. In addition, a linear identical acceleration force $\vec{F}_{lin}$ may act on each of seismic masses 6, 7. A first signal S1 is generated at first electrode 11, which is proportional to a first force $\vec{F}_1 = 2m \cdot (\vec{v}_0 \times \vec{\omega}) \cdot \sin(\Omega \cdot t) + \vec{F}_z$. A second signal S2 is generated at second electrode 12, which is proportional to a second force $\vec{F}_2 = -2m \cdot (\vec{v}_0 \times \vec{\omega}) \cdot \sin(\Omega \cdot t) + \vec{F}_z$. Through addition of first signal S1 and second signal S2, an acceleration variable $S_{acc} \propto \vec{F}_1 + \vec{F}_2 = 2\vec{F}_z$ results, which is proportional to an acceleration in the z' direction. By subtraction of first signal S1 from second signal S2, a rotation-rate variable $S_{rot} \propto 4m \cdot (\vec{v}_0 \times \vec{\omega}) \cdot \sin(\Omega \cdot t)$ results, which is proportional to the rotation around the x axis. Rotation-rate sensors having different constructions are known from the related art. Acceleration variables which are oriented in any arbitrary direction may also be determined correspondingly.

FIG. 3 shows a schematic view of device 4 for controlling airbags 2, 3. The device includes rotation-rate sensor 13, acceleration sensor 14, and integrated circuit 15. Both signals S1 and S2 of rotation-rate sensor 13 and a signal S3 of acceleration sensor 14 are supplied to integrated circuit 15. Integrated circuit 15 is an ASIC, which includes a circuit for analyzing both signals S1 and S2 of rotation-rate sensor 13, a circuit for analyzing signal S3 of acceleration sensor 14, and a plausibility check device. The circuit for analyzing both signals S1 and S2 of rotation-rate sensor 13 determines an acceleration variable Sacc from signals S1 and S2, which is proportional to an acceleration in the z' direction, and a rotation-rate variable Srot. Signal S3 may be a function of an acceleration in the x', y', and/or z' directions according to the construction of acceleration sensor 14. The circuit for analyzing signal S3 of acceleration sensor 14 determines an acceleration variable in the x', y', and/or z' directions from signal S3. The plausibility check device now checks whether the ascertained rotation-rate and acceleration variables are plausible, i.e., clearly indicate a specific driving situation such as a rollover of the motor vehicle or not. Device 15 outputs a driving situation signal SOUT to trigger device controllers 18, 19. Driving situation signal SOUT indicates that a specific driving situation exists. It is recognized whether the motor vehicle is rolling over on the basis of the following criteria:

i.) the absolute values of the rotation rate around a rotational axis in the x' direction and the acceleration in the y' direction each exceed a specific value for a certain period of time;

ii.) the absolute values of the rotation rate around a rotational axis in the x' direction and the acceleration in the z' direction each exceed a specific value for a certain period of time;

iii.) the absolute values of the rotation rate around a rotational axis in the x' direction and the acceleration in the y' direction each exceed a specific value for a specific inclination angle $\alpha$; or iv.) the absolute values of the rotation rate around a rotational axis in the x' direction and the acceleration in the z' direction each exceed a specific value for a specific inclination angle $\alpha$.

The absolute values of the acceleration in the z' direction may be determined as a linear combination of the two acceleration values in the z' direction. Alternatively, criteria ii.) and iv.) may be modified so that the absolute value of the acceleration value, which was determined with the aid of the rotation-rate sensor, and the absolute value of the acceleration value, which was determined with the aid of the acceleration sensor, must each exceed a specific value. For known rotation-rate sensors which are differently constructed or oriented, the accelerations in the y' direction may also be determined as a linear combination of the acceleration in the y' direction or the modified criteria may be applied. As a function of the existing driving situation, triggering device controllers 18, 19 finally control triggering devices 16 and 17 in such a way that side airbags 2, 3 are triggered for a high probability of a rollover, which results in inflation of side airbags 2, 3. Triggering device controllers 18, 19 and triggering devices 16 and 17 are integrated in side airbags 2, 3.

What is claimed is:

1. A method for controlling a device by using a rotation-rate sensor, comprising:

detecting a first sensor signal for a first seismic mass of the rotation-rate sensor;

detecting a second sensor signal for a second seismic mass of the rotation-rate sensor;

ascertaining an acceleration variable and a rotation-rate variable on the basis of the first sensor signal and the second sensor signal; and controlling the device as a function of the acceleration variable and the rotation-rate variable.

2. The method according to claim 1, further comprising:

detecting an additional acceleration variable for an acceleration sensor; and controlling the device as a function of the additional acceleration variable.

3. The method according to claim 2, wherein the device is triggered when the acceleration variable exceeds a threshold value, and when the additional acceleration variable exceeds an additional threshold value.

4. An apparatus for controlling a device by using a rotation rate sensor, comprising:
- an arrangement for ascertaining an acceleration variable and a rotation-rate variable on the basis of a first sensor signal for a first seismic mass of the rotation-rate sensor and a second sensor signal for a second seismic mass of the rotation-rate sensor; and
- an arrangement for controlling the device as a function of the acceleration variable and the rotation-rate variable.

5. The device according to claim 4, wherein the device is controlled as a function of an additional acceleration variable for an acceleration sensor.

6. The device according to claim 4, further comprising an analysis device for the rotation-rate sensor, an analysis device for an acceleration sensor, and a plausibility check device, implemented as an integrated circuit.

7. The device according to claim 6, wherein the device, the acceleration sensor, the rotation-rate sensor, and the integrated circuit are integrated on one chip.

* * * * *